US007630808B2

(12) United States Patent
Behnke et al.

(10) Patent No.: US 7,630,808 B2
(45) Date of Patent: Dec. 8, 2009

(54) METHOD FOR COMPUTING A TARGET SETTING VALUE

(75) Inventors: Willi Behnke, Steinhagen (DE); Joachim Baumgarten, Beelen (DE); Sebastian Neu, Bad Laer (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 161 days.

(21) Appl. No.: 11/385,100

(22) Filed: Mar. 21, 2006

(65) Prior Publication Data

US 2006/0271243 A1 Nov. 30, 2006

(30) Foreign Application Priority Data

May 24, 2005 (DE) .................. 10 2005 014 278

(51) Int. Cl.
*G08B 21/00* (2006.01)
(52) U.S. Cl. ............. 701/50; 56/10.2 R; 56/10.2 F
(58) Field of Classification Search ............ 701/50; 56/10.2, 318, 10.2 R, 10.2 A, 10.2 F; G08B 21/00
See application file for complete search history.

(56) References Cited

U.S. PATENT DOCUMENTS

| | | | | |
|---|---|---|---|---|
| 5,015,997 A | * | 5/1991 | Strubbe ............. | 340/684 |
| 5,704,200 A | * | 1/1998 | Chmielewski et al. | 56/10.2 E |
| 5,775,072 A | * | 7/1998 | Herlitzius et al. ...... | 56/10.2 R |
| 7,427,231 B2 | * | 9/2008 | Brome et al. ........... | 460/1 |
| 7,478,518 B2 | * | 1/2009 | Kraus et al. ........... | 56/10.2 R |
| 7,483,780 B2 | * | 1/2009 | Strosser et al. ........ | 701/50 |
| 7,503,160 B2 | * | 3/2009 | Degen et al. ........... | 56/10.2 R |
| 7,543,676 B2 | * | 6/2009 | Richman et al. ....... | 180/271 |
| 7,555,883 B2 | * | 7/2009 | Fackler et al. ......... | 56/10.2 E |
| 2003/0066277 A1 | | 4/2003 | Behnke | |

FOREIGN PATENT DOCUMENTS

DE    101 47 733    4/2003

* cited by examiner

*Primary Examiner*—Tuan C To
(74) *Attorney, Agent, or Firm*—Michael J. Striker

(57) ABSTRACT

In a method for computing a target setting value—which is adapted to a harvesting process—for a control parameter of a working unit of a harvesting machine, operating-result curves are plotted for a plurality of different operating-result parameters as a function of the related control parameter, a target setting value of the control parameter is subsequently computed based on a combination of the plotted operating-result curves, and a method and a corresponding control unit for controlling a working unit of a harvesting machine, and a harvesting machine with a control unit of this type are also provided.

19 Claims, 9 Drawing Sheets

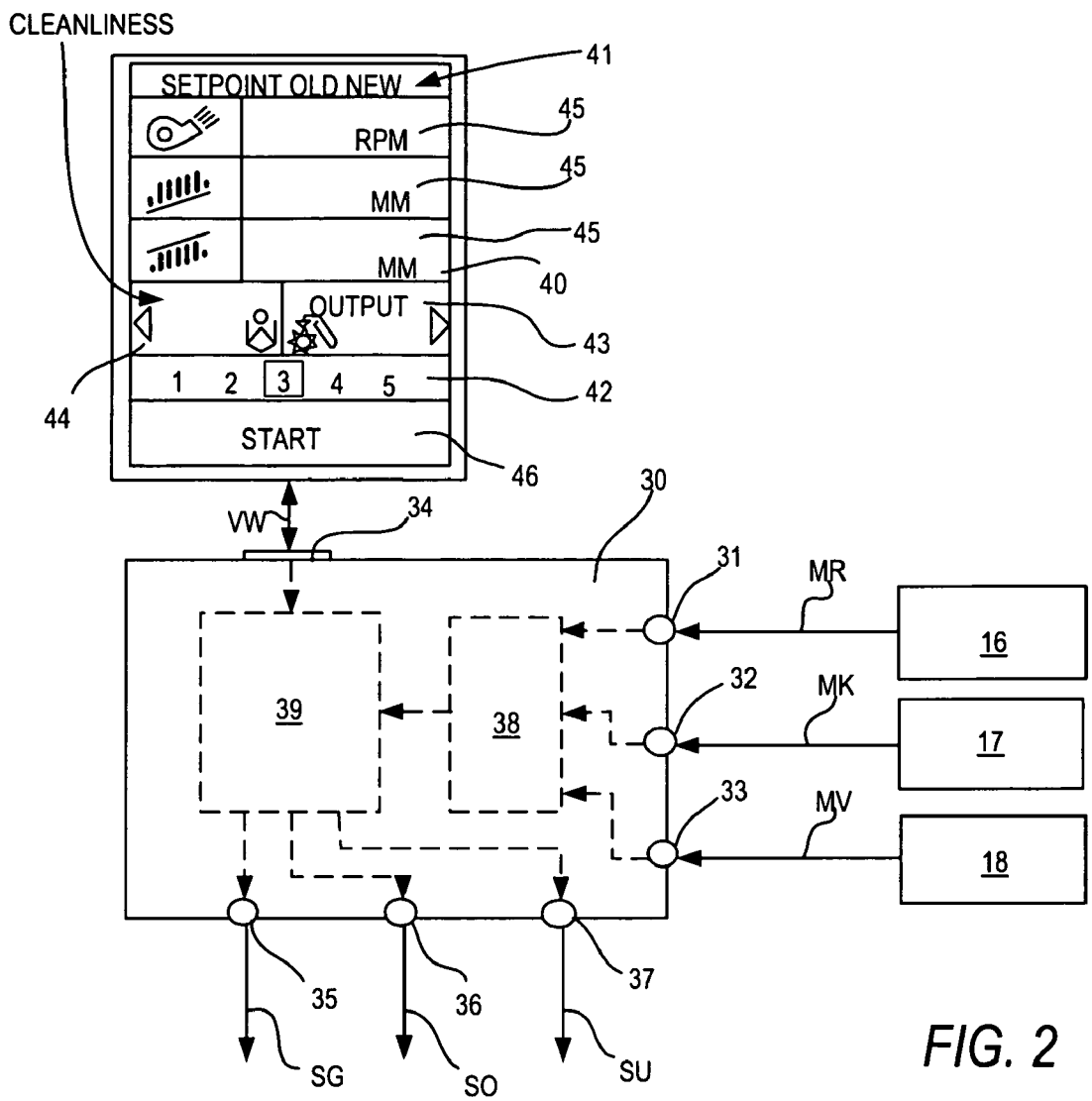
FIG. 2
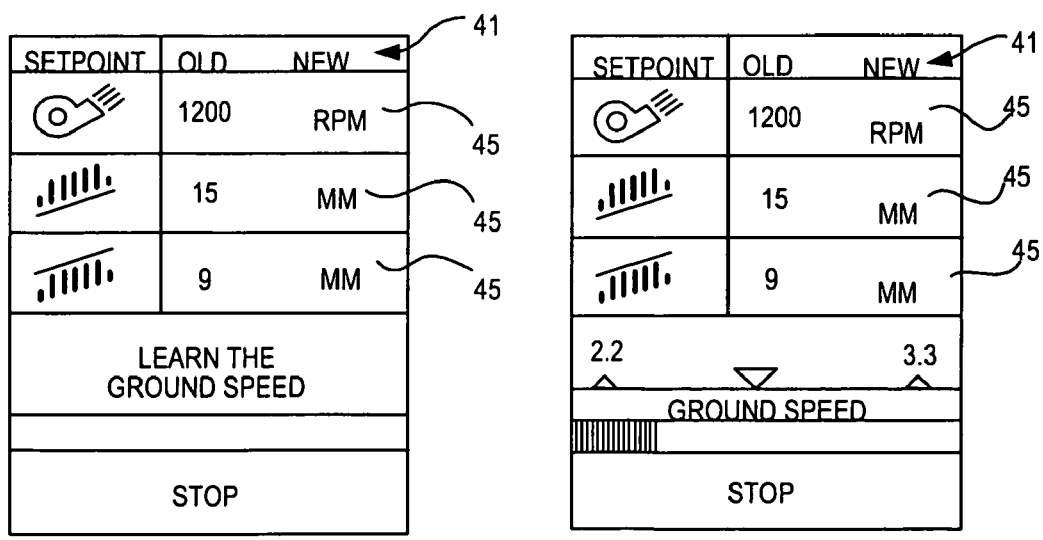
FIG. 3
FIG. 4

METHOD FOR COMPUTING A TARGET SETTING VALUE

BACKGROUND OF THE INVENTION

The present invention relates to a method for computing a target setting value—which is adapted to a harvesting process—for a control parameter of a working unit of a harvesting machine, in particular a combine harvester. The present invention further relates to a method and a corresponding control unit for controlling a working unit of a harvesting machine, and a harvesting machine with a control unit of this type.

Modern agricultural harvesting machines, in particular self-propelled harvesting machines such as combine harvesters, forage harvesters, etc., include one or more adjustable working units for processing various types of crops. With modern harvesting machines, the individual units are equipped with adjusting devices—which are usually remotely controllable from the driver's cab—with which various control parameters of the working units can be set. Typical working units of a combine harvester are, e.g., the threshing mechanism, which usually includes a concave and one or more cylinders, and a cleaning unit located downstream of the threshing mechanism, the cleaning unit typically including a blower and a plurality of sieves. Different types of crops and harvesting conditions, such as moisture, crop height, ground conditions, etc., require that the individual units and/or their adjustable control parameters be adjusted as exactly as possible to the specific, on-going harvesting process, in order to obtain an optimum operating result overall.

Despite the many setting aids offered to operators by the manufacturers of harvesting machines—such as comprehensive operator training, printed lists of setting values predetermined for various harvesting situations that the operator can refer to, and electronic tools such as electronic fieldwork information systems preprogrammed with optimized combinations of setting values for highly diverse harvesting situations for the operator to choose from—it is still relatively difficult for operators to adjust the machine such that it functions in an optimum manner in accordance with the desired requirements. This is the case, in particular, for inexperienced and/or untrained operators, particularly at the beginning of a harvesting season. In many cases, therefore, the harvesting machine and/or its working units are not adapted to the current harvesting process in an optimum manner. As a result, the available harvesting capacity of the machine is under-utilized, poor operating results are obtained, or, in some cases, unnecessary crop losses result.

To solve this problem, DE 101 47 733 A1 provides an automated method for computing a setting for an agricultural harvesting machine which has been adapted to the harvesting process. With this method, one control parameter of the harvesting machine is varied while the setting remains the same and the harvesting conditions are the same. The operating results are subsequently compared to select exactly that setting value for the particular control parameter that delivered a better operating result. Using this method, even inexperienced operators learn relatively quickly whether, when and to what extent the varied control parameter affects the operating result, and they can set the control parameter accordingly. The setting can also be carried out automatically, of course. The operating-result values can be recorded, in particular, and, by referring to the recorded operating results, a relationship between the varied setting parameter and the operating result obtained can be identified. Based on this relationship, an optimum setting parameter that leads to the best operating result can then be selected.

Since a system is involved with most of the working units on harvesting machines, however, setting one control parameter affects highly diverse operating-result parameters. For example, setting a blower speed—which is a single control parameter of the cleaning unit of a combine harvester—influences not only the losses due to cleaning, but also the total tailings and grain tailings. The tailings are the crop material components that are returned to the threshing unit to be threshed again. A distinction is made between total tailings, which is the total quantity of tailings, and grain tailings, which refers to the grain portion of the total tailings. The losses due to cleaning are the portions of grain carried out of the machine with the non-grain components as a loss. A main objective of selecting the setting, of course, is to keep losses to a minimum. Since tailings place an additional load on the threshing unit, however, the quantity of tailings should also be a minimum, in the ideal case. Unfortunately, it is not necessarily the case that, when the blower speed is varied from a certain point outward in a certain direction, that all of the various operating-result parameters mentioned above, e.g., losses due to cleaning, total tailings and grain tailings, are automatically improved, since the minimum values of the various operating-result parameters are not all located at the same blower speed. This example also applies for other control parameters of the cleaning unit, e.g., the upper sieve width setting and the lower sieve width setting, and for a large number of other working units and their control parameters. In most cases, the various operating-result parameters are a not a function of just one control parameter, but of a large number of control parameters. Conversely, changing one control parameter affects a plurality of operating-result parameters.

SUMMARY OF THE INVENTION

It is therefore an object of the present invention to create an improved target setting value determination method, and a method and control unit for controlling a working unit of a harvesting machine that permit the most reliable, simple and automatable selection of a target setting value, even when very complex setting dependencies are involved, the target setting value being optimally adapted to the particular harvesting process, and to therefore permit optimized control of the working unit.

In keeping with these objects and with others which will become apparent hereinafter, one feature of the present invention resides, briefly stated, in a method for computing a target setting value (ZG, ZO, ZU) which has been adjusted according to a harvesting process, for a control parameter (SG, SO, SU) of a working unit of a harvesting machine, the method comprising the steps of plotting operating-result curves (KR, KK, KV) for a plurality of different operating-result parameters as a function of a related control parameter (SG, SO, SU); and, based on a combination of the operating-result curves (KR, KK, KV), computing the target setting value (ZG, ZO, ZU) of the control parameter (SG, SO, SU).

Another feature of the present invention resides, briefly stated, in a method for controlling a working unit of a harvesting machine, comprising a first step including computing a target setting value (ZG, ZO, ZU) for a control parameter (SG) of the working unit as defined in claim 1; and subsequently controlling the working unit based on a target setting value (ZE) that was determined.

Still a further feature of the present invention resides in a control unit for controlling a working unit of a harvesting machine, comprising a number of measured-value inputs for acquiring operating-result measured values (MR, MK, MV) of various operating-result parameters of the working unit; a curve calculating unit for computing operating-result curves (KR, KK, KV) for the various operating-result parameters, each of which is based on a number of the operating-result measured values (MR, MK, MV) of a particular operating-result parameter acquired at various setting values of a certain control parameter (SG, SO, SU) of the working unit; a target setting value detection unit for computing a target setting value (ZG, ZO, ZU) adapted to a harvesting process for the control parameter (SG, SO, SU) based on a combination of the operating-result curves (KR, KK, KV) of the various computed-operating result parameters; and a control parameter output for controlling an operation selected from the group consisting of controlling the working unit based on the computed target setting value (ZG, ZO, ZU); offering the computed target setting value (ZG, ZO, ZU) to an operator to use in controlling the working unit, and both.

According to the present invention, in order to compute an optimum target setting value for a certain control parameter, the first step is to plot operating-result curves for each of a plurality of various operating-result parameters as a function of the particular control parameters. The target setting value of the control parameter is then computed based on a combination of the operating-result curves that were plotted.

Combining the operating-result curves ensures that, even when the various operating-result parameters have very complex dependencies on the particular control parameters, an optimum target setting value is still found for the current harvesting conditions, thereby ensuring that the machine achieves an operating result that is optimum overall for the given conditions.

In the method according to the present invention for controlling a working unit of a harvesting machine, this target setting value—which was computed as described above—is used as the "setpoint" for the particular control parameters, in order to control the working unit.

A control unit according to the present invention requires, among other things, a number of measured-value inputs in order to acquire operating-result measured values for various operating-result parameters of the working unit. This control unit also requires a curve calculating unit to plot operating-result curves for the various operating-result parameters, each curve being based on a number of operating-result measured values for the particular operating-result parameter acquired at various setting values of a certain control parameter of the working unit. A control unit of this type must also include a target setting value computation unit in order to compute a target setting value—which has been adapted to a harvesting process—for the control parameter based on a combination of the plotted operating-result curves for the various operating-result parameters. Finally, the control unit requires a control-parameter output to control the working unit directly based on the computed target setting value, or to at least offer an operator the setting values of the particular control parameter so he can make a selection for control purposes. With a control unit of this type, the particular control parameter can be automatically adapted to the current harvesting conditions in an optimum manner, and the operator need not have extensive experience in doing this.

A control unit of this type can be designed in the form of a programmable microprocessor, in particular, the curve calculating unit and the target setting value computation unit being implemented in the form of software on this processor. It is also possible to design an existing programmable control unit of a harvesting machine according to the present invention by implementing units realized in the form of software modules, provided this control unit includes an appropriate number of measured value inputs for acquiring the required operating-result measured values and the corresponding control-parameter outputs. The required software components and/or all required program code means can be loaded directly into the memory of the programmable control unit, e.g., using a data memory, as a computer program product, in the form of an update in particular.

The method for controlling a working unit can also be refined in accordance with the method for computing a target setting value, and vice versa. The control unit can also be refined in accordance with the dependent method claims.

To plot an operating-result curve, operating-result measured values are preferably acquired for a number of various setting values of the control parameter. A mathematical function is then adapted to the operating-result measured values as a function of the setting values, the mathematical function ultimately forming the operating-result curve.

The measured values can be preferably acquired by measuring the particular control parameter alternately at high and low setting values. In this manner, the situation can be prevented in which, during extended operation in a certain working range of the control parameter, systematic measurement errors are prevented from forming and being added accumulatively. This also prevents the possibility of the working units becoming overloaded when, e.g., operating-result measured values must be acquired in an extreme working range of the control parameter.

The number and scattering of measured values, i.e., the working range across which the setting values of the control parameter for recording the measured values vary, depends on the circumstances of the particular measurement, the type of control parameter, the type of operating-result parameter, and, possibly, on the mathematical function to be adapted, including, in particular, any advance knowledge of the curve to be expected. A fixed number of setting values can be specified in advance, for example. It can also be specified in advance that exactly certain setting values of the control parameter must be applied to acquire the operating-result measured values. It is also possible to select the number and position of the setting values as a function of current conditions and/or on the basis of advance knowledge of previous optimization cycles, etc., especially for use in the current computation of the target setting value. It must be taken into account that a large variance, i.e., the broadest possible range of variation of the control parameter, has the advantage that it increases the level of certainty with which a mathematical function that describes the actual curve as exactly as possible can be graphed. On the other hand, performing a measurement within a small range of variation has the advantage that measuring time is shortened and it is not necessary to work in extreme loss ranges while the measurement is being performed, provided, e.g., that losses must be measured as operating results. As a result of the method according to the present invention for computing the setting value, the losses that occur during the optimization process itself are less substantial.

Highly diverse fit methods can be used to calculate a mathematical function that is adapted to the operating-result measured values depending on the type of scattering of the operating-result measured values and the shape of the curve that is expected. It can be ensured that, regardless of the form, deviations of the measured values from the curve are minimized, but "outliers" among the measured values do not matter very much.

With a particularly preferred exemplary embodiment, the operating-result measured values are subjected to a regression analysis for this purpose. In order to describe a linear dependency of the operating-result measured value on the control parameter, a linear regression method can be used, for example, to describe a parabolic dependency, i.e., a quadratic regression. To ensure that a physically meaningful assertion can be made, at least four measured values should be applied in a quadratic regression. Particularly preferably, operating-result measured values are plotted for five different setting values of the control parameter, however. This is a very good compromise between minimizing the measuring time and obtaining the necessary number of test points in order to generate a parabolic operating-result curve with informative value. Preferably, all operating-result measured values for various operating-result parameters are determined simultaneously as a function of the varied control parameter. This means, e.g., the control parameter is set for a certain measurement setting value, then the operating-result measured values are acquired in parallel for all operating-result parameters that are dependent on this measurement setting value. Measurement time is shortened considerably in this manner. All operating-result parameters can also be measured independently, of course, provided this would be a meaningful approach for certain reasons in a specific case.

Preferably, when a target setting value is computed, a default value specified by the operator, for example, can be taken into account. The operator of the harvesting machine can therefore determine whether a certain operating-result parameter is more important than other operating-result parameters for the on-going harvesting process. For example, the option to select either "increased cleanliness" or "increased cleaning output" can also be provided among the settings for a cleaning unit on a combine harvester. If increased cleanliness is selected via the default value, a narrower sieve setting than the target setting value can be selected, for instance. If increased cleaning output is required, a somewhat wider sieve opening than the target setting value is selected.

There are highly diverse methods for computing the target setting value based on a combination of the plotted operating-result curves.

With a preferred exemplary embodiment, a curve-specific target setting value or a curve-specific target setting value range, e.g., a range below or above a certain threshold value capable of being determined using the curve, is initially computed separately for each of the operating-result curves. These curve-specific target setting values or target setting value ranges are then linked with each other in a suitable manner.

With a preferred variation, the extreme values and/or inflection points of the operating-result curves are calculated in order to determine the target setting value of the control parameter, and they are linked according to a predetermined rule. In other words, the curve-specific target setting values or target setting value ranges are defined in this case by the extreme values and/or inflection points.

With cleaning-loss curves, tailings curves, or curves for other operating-result parameters, the purpose of which is to keep the measured values as low as possible, the minimum values of the operating-result curve are calculated, for example, and linked according to a predetermined rule. With operating-result parameters defined to attain the highest results possible, e.g., in terms of the quantity of crop material that is conveyed, the maximum values of the particular operating-result curves can be used.

A link of this type can be carried out, e.g., by calculating the mean of the extreme values or inflection points of the operating-result curves. A weighted mean can also be calculated.

With a preferred exemplary embodiment, the extreme value and/or the inflection point of at least one of the operating-result curves is acted upon with an offset value, e.g., before the mean is calculated. This offset value can be selected, e.g., by compensating once more for systematic errors that are unavoidable, e.g., due to the position of sensors with which the operating-result measured values are recorded, or for other reasons. An offset value of this type can also be used to weight various curves with respect to each other.

In particular, an offset value of this type can also be selected as a function of the default value entered in advance by the operator, in order to obtain a target setting value that corresponds to the requirement, e.g., for increased cleanliness or increased cleaning output in the case of a cleaning unit, for example.

The offset value can be selected, preferably, as a function of the slope of the operating-result curve in the particular range. As such, the manner in which the application of the offset affects the particular operating result can be taken into account.

As an alternative to the linking of extreme values or inflection points described above, it is also possible (as mentioned briefly, above) to determine a threshold value based on an initial operating-result curve and to use this threshold value to compute the target setting value for a second operating-result curve in a supplementary manner. The target setting value then depends primarily on the second operating-result curve, but it does not lie above or below the threshold value specified via the first operating-result curve.

If the working unit includes a cleaning unit, or if the working unit is a cleaning unit, separating curves are preferably plotted as operating-result curves for the cleaning losses and/or grain tailings and/or the total tailings. In this case, the blower speed and/or the upper-sieve opening width of the cleaning unit are then preferably set based on all three separating curves. The lower-sieve opening width of the cleaning device is preferably set, however, based only the separating curves for the grain tailings and the total tailings.

Since, with working units such as a threshing mechanism and/or a cleaning unit in particular, the operating-result measured values depend, to a great extent, on the throughput, which, in turn depends primarily on the crop quantity and ground speed, these harvesting conditions are held constant within a certain tolerance range over a predetermined measurement period in order to acquire the most unequivocal operating-result measured value possible. It is therefore preferably ensured that, once the measurement has started, the driver holds the speed as constant as possible while the measurement is being carried out. An automated method of holding the harvesting conditions constant can also be provided, of course.

Advantageously, measurement of an operating-result measured value is automatically interrupted when the harvesting machine is driven out of a field to be harvested, and is automatically restarted when the harvesting machine is driven back onto the field to be harvested. Various possibilities for keeping the harvesting conditions as constant as possible over the predetermined measurement period, for automatically interrupting it when the harvesting machine is driven out of a field to be harvested and restarting it when the harvesting machine is driven back onto the field to be harvested will be described in greater detail below.

The target setting values computed in a manner described according to the present invention are used, as mentioned above, in a method according to the present invention for the automated control of a working unit of the harvesting machine by controlling the working unit based on the computed target setting value.

According to this method, target setting values for various control parameters of the working unit are preferably computed in succession. An initial target setting value for a first control parameter is computed, then the working unit is initially controlled based on the computed target setting value. A further target setting value is then computed for a further control parameter of the working unit, and it is also set. This method is continued until all control parameters have been set in an optimum manner. Instead of the working unit being controlled immediately and automatically with the computed target setting value, the computed target setting value can first be offered to the operator for selection, e.g., in a display. The operator can accept the value, e.g., by entering a confirmation command.

If a cleaning unit is controlled using the method according to the present invention, a target setting value for a blower speed is preferably computed in a first step, a target setting value for the upper-sieve opening width is computed in a second step, and a target setting value for a lower-sieve opening width of the cleaning device is computed in a third step. The particular components are then preferably controlled immediately using the computed target setting value.

The initial setting values to be used in an optimization of this type are preferably grain-dependent setting values predetermined by the manufacturer of the harvesting machine for certain crops under certain harvesting conditions, or that were computed in advance by the operator of the harvesting machine under similar conditions for the crop being harvested. In particular, crop-dependent setting values stored in an electronic fieldwork computer system can be used as the initial setting values. In the optimization process, these initial setting values are first entered for the various control parameters One of the first control parameters is then varied, the associated measured values are plotted, and an optimum setting value for this control parameter is then identified in a manner according to the present invention. A second control parameter is then optimized in this manner, etc., until all of the desired control parameters have been optimized. The operator can determine which of the control parameters to optimize. Normally, all control parameters are optimized, to the extent this is possible.

Preferably, after a certain period of time and/or when a predetermined event occurs, a new target setting value for a control parameter of the working unit is computed, and the working unit is controlled based on the new setting value. It is also possible, of course, to recompute an entire chain of target setting values for various control parameters of the working unit, for example, as described above.

The certain time period can be selected such that optimization is carried out whenever it is expected that the harvesting conditions have changed. For example, with a harvesting process that takes an entire day to complete, reoptimization can be carried out in the morning, in the afternoon and in the evening, because it is possible that the straw moisture in the crop material changed over the course of the day.

The events that could make it necessary to reoptimize the target setting values can include, in particular, a change in throughput, e.g., if harvesting is carried out at a speed that differs from the speed that existed when the target setting values were determined. The event can also be a change to a control parameter of another working unit of the harvesting machine. It can be assumed, for example, that the cleaning load in a combine harvester changes considerably if the threshing mechanism was repositioned to a considerable extent. Events can also be predetermined via other measurement sensors, so that the target setting values are recomputed, e.g., depending on the crop, i.e., when a changed property of the crop, such as grain moisture, is measured.

When a recomputation of the target setting values is started, i.e., for the re-start of optimization, the target setting values computed in the previous optimization are preferably used as the default setting for the measurement.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows a schematic depiction of a control unit for controlling a cleaning unit of a combine harvester that includes a connected control terminal with a user interface, in a first process state, FIG. 3 shows a depiction of a user interface of the control terminal according to FIG. 2, in a second process state, FIG. 4 shows a depiction of a user interface of the control terminal according to FIG. 2, in a third process state.

DESCRIPTION OF THE PREFERRED EMBODIMENTS

Figure 1:
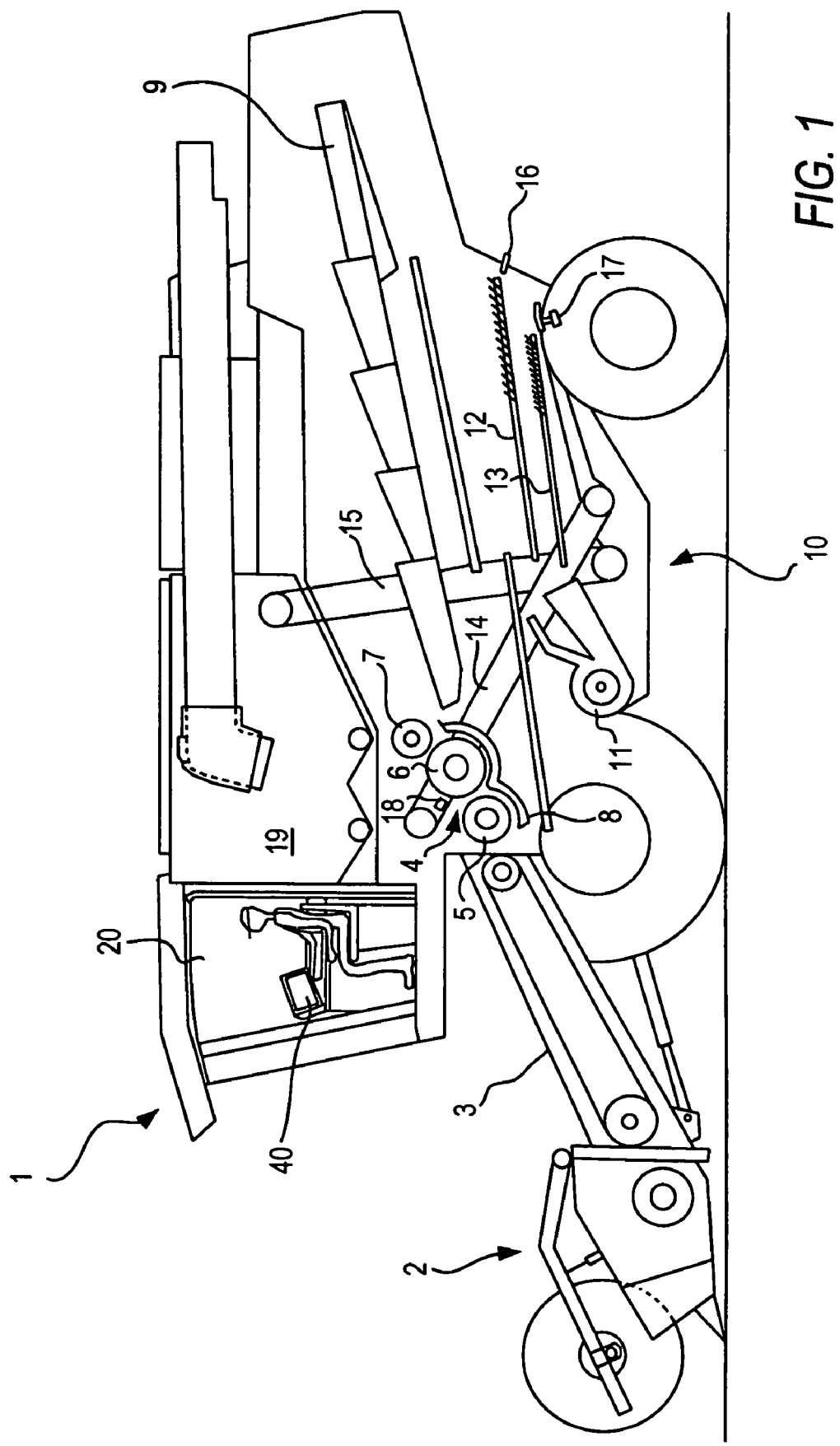
FIG. 1 shows a schematic cross section through a combine harvester.

The exemplary embodiment of the present invention shown in FIG. 1 is a self-propelled combine harvester 1 with a tangential or cross-flow threshing mechanism 4 and a plurality of shakers 9 located behind it, as the separating unit. The separating unit is composed of a plurality of tray-type shakers 9 with a plurality of shaking speeds. A cleaning unit 10 is located beneath shaker 9, which is composed of a plurality of sieves 13 located one on top of the other, and a blower 11.

The mode of operation of a combine harvester 1 of this type is as follows:

Using a reel of the cutting disc, the crop material is placed on mowing unit 2 and is cut using knives. The crop material is then conveyed via a header auger and a feed rake in a feeder housing 3 to the inlet of threshing mechanism 4.

A feed and/or pre-acceleration cylinder 5 is located at the inlet of threshing mechanism 4. Located behind threshing mechanism 4, in the direction of crop flow, is a cylinder 6 with an axis of rotation positioned transversely to the direction of crop flow, i.e., transversely to the longitudinal axis of the combine harvester. Located beneath cylinder 6 is a concave 8 which is shaped to encompass cylinder 6. The crop material coming out of feeder housing 3 is grasped by pre-acceleration drum 5 and pulled further by cylinder 6 through the threshing gap between cylinder 6 and concave 8. The crop material is threshed, i.e., beaten and/or crushed, by the beater bars of cylinder 6, a grain-chaff mixture falling downward through concave 8 and being subsequently guided to cleaning unit 10 in order to separate the grains from the admixtures, i.e., stalk and chaff parts.

From threshing mechanism 4, the threshed crop flow is directed by impeller 7 to tray-type shaker 9, via which the grain and any short straw and chaff located in the crop flow is separated out. The grain, short straw and chaff also reach cleaning unit 10, where the grain is separated from the short straw and chaff.

The grain is separated from the non-grain components in cleaning unit 10 in a manner such that wind is blown through the sieve openings (holes, mesh, slits) into sieves 12, 13—which are driven in an oscillating manner—using blower 11, the wind loosening the crop material directed over sieves 12, 13 and ensuring that the specifically lighter chaff and short-straw portions are separated out, while the heavy crop grains fall through the sieve openings. An upper sieve 12 and a lower sieve 13 are located one on top of the other in certain areas such that the crop material is sifted with different levels of fineness at the various levels.

The grain that passes through both sieves 12, 13 of cleaning unit 10 falls to a first capture and guide floor and is conveyed to a grain-delivery auger. The grain is then conveyed by an elevator 15 into a grain tank 19 of combine harvester 1, from where it can be transferred to a trailer as necessary using a tank unloading conveyer.

The particles in cleaning unit 10 that initially fall, at the rear end, through the sieve openings of upper sieve 12 are typically heavier particles, i.e., particles that contain a grain particle that has not been fully separated from other components of the grain. These particles fall, behind lower sieve 13, onto a second capture and guide floor located beneath and somewhat behind the first capture and guide floor, and are returned to threshing mechanism 4 as tailings via a tailings elevator 14.

Components that do not fall through upper sieve 12 are discarded as a loss. The straw and a certain percentage of waste grain also travel via tray-type shaker 9 to the rear end of combine harvester 1, from where they are ejected.

With the exemplary embodiment below it is assumed that, according to the present invention, the objective is to compute target setting values ZG, ZO, ZU for various control parameters SG, SO, SU of cleaning unit 10 of a combine harvester, e.g., for the upper-sieve opening width, the lower-sieve opening width, and the blower speed. The method according to the present invention has already been proven to be effective for setting a cleaning device 10 of this type, and it can therefore be used particularly advantageously. The method according to the present invention and/or the corresponding control unit can also be used, of course, to set other working units, e.g., the rotational speed of the cylinder or the width of the concave on any other harvesting machine. For reasons of completeness, reference is also made to the fact that the present invention can also be used very well to control cleaning units on other types of combine harvesters.

To compute target setting values ZG, ZO, ZU adapted to the harvesting process for the various control parameters SG, SO, SU of cleaning unit 10, various operating-result measured values MR, MK, MV for different operating-result parameters must be measured and, based on these operating-result measured values MR, MK, MV, operating-result curves KR, KK, KV must be plotted.

With the exemplary embodiment shown, the losses due to cleaning and the total tailings and grain tailings are observed as the operating-result parameters used to compute the target setting values for the various control parameters. The grain tailings are the grain components contained in the total tailings.

Different measuring units 16, 17, 18 are located in various locations in the combine harvester for this purpose.

A cleaning-loss measuring unit 16 is located directly beneath the rear end of upper sieve 12 and is used to measure the losses due to cleaning, the cleaning-loss measuring unit 16 typically being designed as a knock sensor. The signal detected by knock sensor 16 is a measure of how many components fall directly behind upper sieve 12. Based on this information, the total loss can be estimated relatively well.

The total tailings are measured with the aid of a total tailings-measuring unit 18 located in tailings elevator 14. It measures the total quantity conveyed, e.g., via the weight conveyed by tailings elevator 14 or optical and/or capacitive measurements etc. The grain portion of the total tailings, i.e., the grain tailings, is measured using a grain-tailings measuring unit 17 located on the second capture and guide floor behind lower sieve 13. Grain-tailings measuring unit 17 is also preferably a knock sensor, the output signal of which is a measure of the amount of grain that falls behind lower sieve 13 into the tailings.

All of these measuring units 16, 17, 18 are connected to a control unit 30. A control terminal 40 is also connected to control unit 30, control terminal 40 having a display with a user interface 41 with which a driver can operate and/or program control unit 30. Control terminal 40 is located inside driver's cab 20. The connection of individual measuring units 16, 17, 18 and control terminal 40 with control unit 30, and control unit 30 itself, are not shown in FIG. 1, to prevent the figure from becoming overly complex. Instead, a somewhat more detained depiction is shown in FIG. 2, to which reference is made for the explanations to follow.

In this case, control unit 30 includes three measured-value inputs 31, 32, 33, to which measuring units 16, 17, 18 are connected. Cleaning-loss measured values MR are transmitted by cleaning-loss measuring unit 16 to input 31 of control unit 30, grain-tailings measured values MK are transmitted by grain-tailings measuring unit 17 to input 32 of control unit 30, and volume-tailings measured values MV are transmitted by volume-tailings measuring unit 18 to control unit 30.

Control unit 30 also has three control parameter outputs 35, 36, 37, via which the setting values for the control parameters "blower speed" SG, "upper-sieve width setting" SO and "lower-sieve width setting" SU are transferred as setpoints to the particular components of cleaning unit 10. Using appropriate (not shown) sensors, control unit 30 can check to determine whether the desired setting values were actually attained.

Control terminal 40 is connected to control unit 30 via a terminal interface 34. In this case, control terminal 40 is designed as a touchpad which the operator can use to press on certain regions of user interface 41 to enter certain input commands.

In the upper region of user interface 41, three setting-value display fields 45 for the blower speed, upper-sieve setting and lower-sieve setting (from top to bottom) are depicted, one below the other. The value of control parameter SG, SO, SU that was originally set for the individual components, and the new target setting value ZG, ZO, ZU are displayed in setting-value display fields 45 during operation.

Two default fields 43, 44 are located in the next row down in the display. By pressing default fields 43, 44, the operator can select a default value VW, which is transmitted to control unit 30. Default value VW is displayed in a default value display 42 directly below default fields 43. When the operator presses left default field 44, default value VW is reduced. As a result, the optimization process ensures that, in the harvesting process, greater emphasis is placed on "increased cleanliness" than on cleaning output. Conversely, when the operator presses on right default field 43, default value VW is increased, so that the optimization process places greater emphasis on the criterium "increased cleaning output" than on cleanliness. A start field 46 is located under default-value display 42. Start field 46 is pressed to start the optimization process.

It should be noted that user interface 41 can also have a completely different design, of course. In particular, it can also be part of a larger control terminal 40 where even more regions for setting other components are displayed, and where additional information for the operator is displayed. It is also possible to use another form of user interface other than a touchpad.

In this case, control unit 30 is designed in the form of a programmable microprocessor, on which components which are essential to the present invention are implemented in the form of software modules, the components including, e.g., a curve calculating unit 38 which uses input signals MR, MK, MV to calculate operating-result curves KR, KK, KV, and a target setting value computation unit 39 which uses curves KR, KK, KV and default value VW set via control terminal 40 to respectively calculate the target setting values for the various control parameters SG, SO, SU.

A control unit 30 that serves only to control cleaning unit 10 is shown in FIG. 2. It is clear that a control unit 30 of this type can also control other working units, e.g., the threshing mechanism of combine harvester 1, and that the control units for highly diverse types of working units can be located in the form of modules in a master control unit of combine harvester 1. It is also clear that a control unit of this type can also include further measured-value inputs and control-parameter outputs. For example, combine harvester 1 can also include sensors in the feeder housing for measuring the height of the crop layer, and/or further sensor units in the grain tank and/or at the outlet of the grain elevator, such as a yield measuring device for determining the total quantity of grain, or grain breakage detectors, with which damaged and/or broken grains can be detected, or sensors located at the end of the tray-type shakers for determining the straw walker losses.

None of these components are depicted in the exemplary embodiment shown in FIG. 2, however, to prevent the figure from becoming overly complex.

Figure 5:
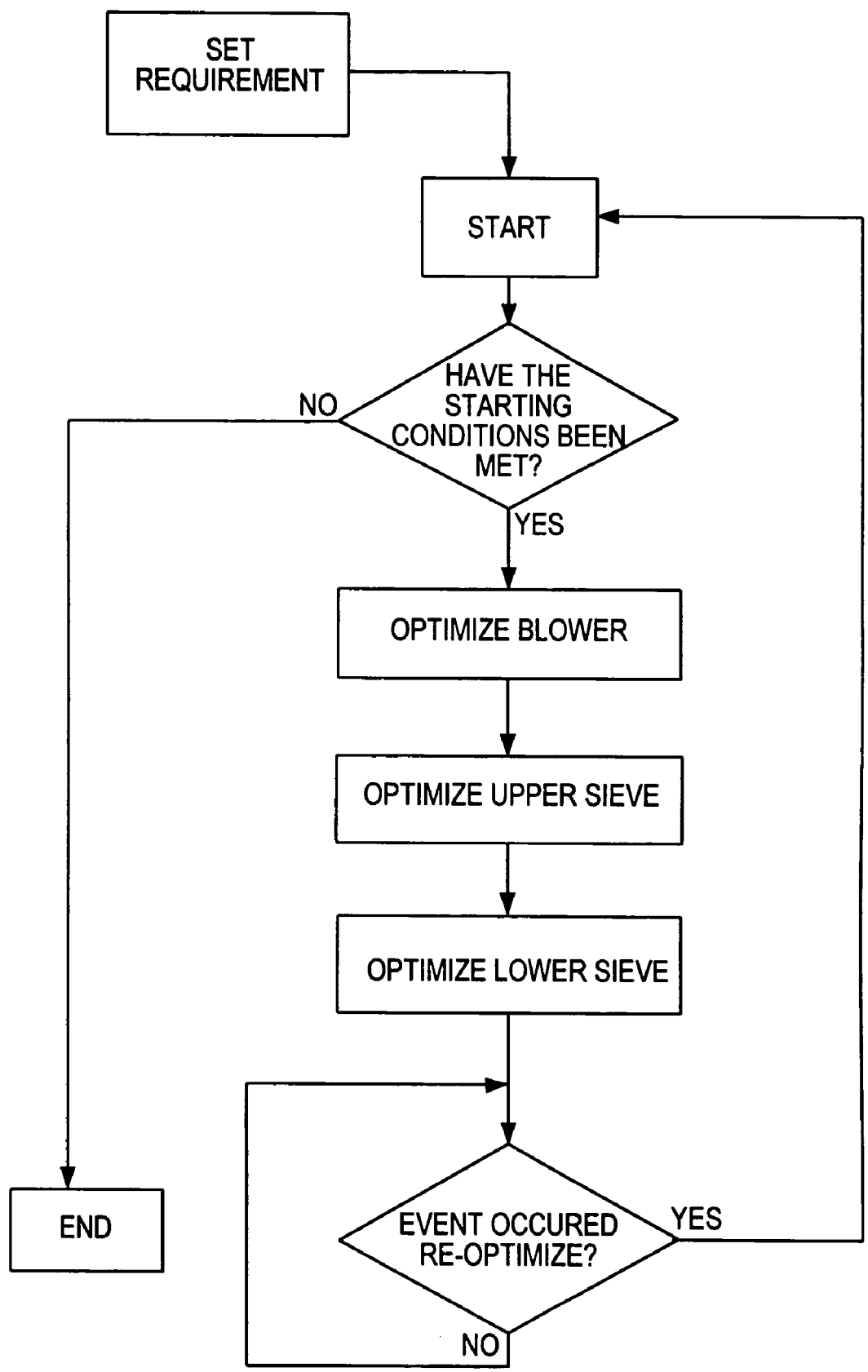
FIG. 5 shows a flow chart of a possible sequence of steps in an optimization of the cleaning unit of a combine harvester.

Reference is made to FIG. 5 in the explanation of the sequence of steps that take place in a complete optimization process of cleaning unit 10.

The process starts when the operator enters a default value VW, as described above. The operator then starts the optimization process. To start the optimization process, the operator touches start field 46 on control terminal 40 (refer to FIG. 2). In the next step, a check is carried out to determine whether the necessary starting conditions are given, i.e., whether the threshing units and cleaning unit 10 have been set. If they have not, the process is halted immediately.

If they have, optimization of the blower speed is started. Setting values specified by the electronic fieldwork system for the particular type of crop are first selected as the starting values for the individual control parameters.

To measure operating-result curves KR, KK, KV, operating-result measured values KR, KK, KV are then acquired for various setting values $M_1$, $M_2$, $M_3$, $M_4$, $M_5$ (also referred to below as "test points") of the control parameter to be optimized. Since the objective in this case is to first optimize the blower, operating-result measured values MR, MK, MV are measured at various measuring points $M_1$, $M_2$, $M_3$, $M_4$, $M_5$ of the blower speed. While performing a measurement of this type, the other parameters must not be changed, and any other harvesting conditions must be held as constant as possible. The applies to throughput in particular.

Figure 6:
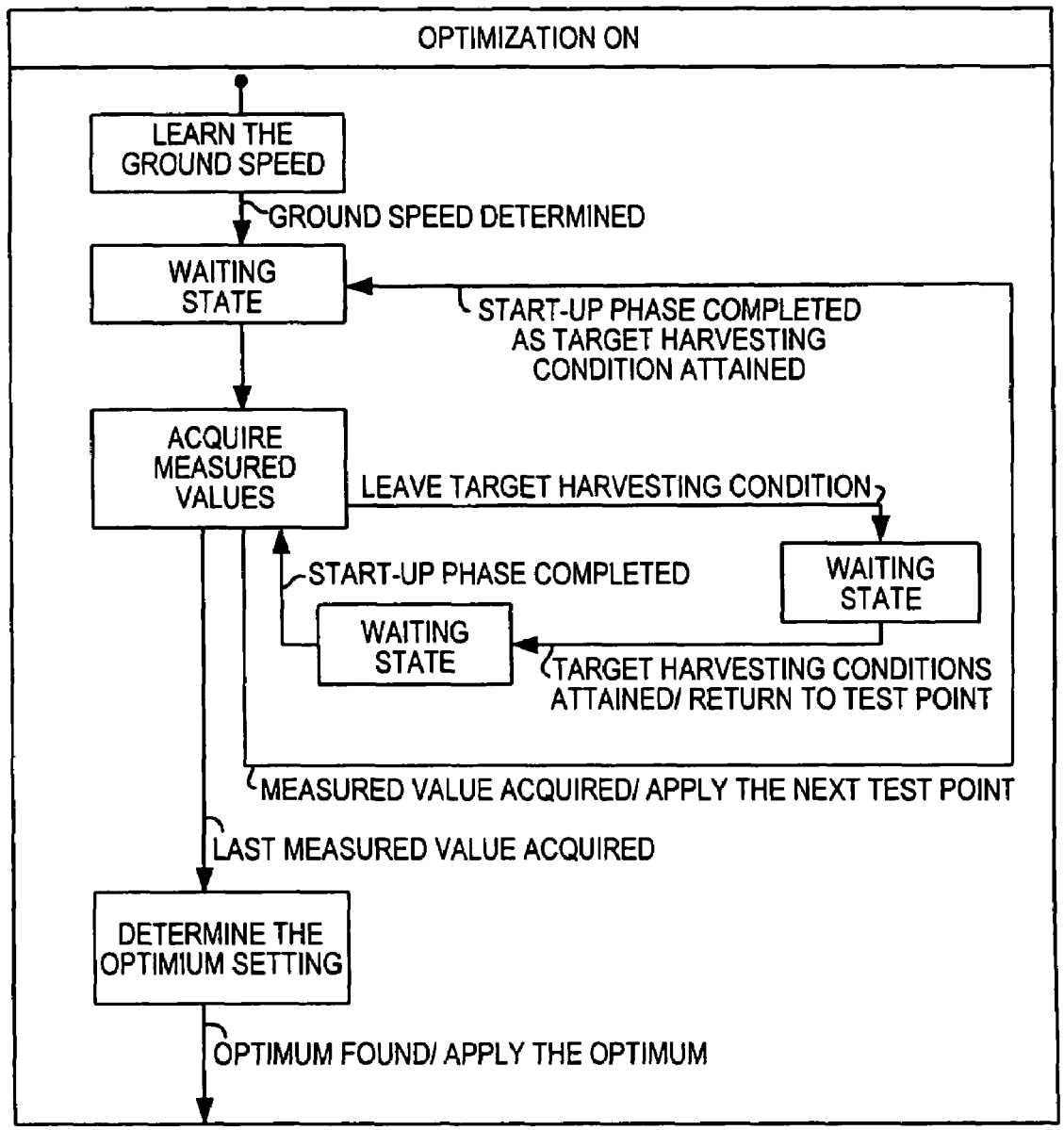
FIG. 6 shows a diagram of a possible sequence of an optimization of one of the control parameters within a method sequence according to FIG. 5.

All of the steps involved in the measurement procedure up to the point at which optimum target setting value ZG is determined are depicted schematically in FIG. 6. This figure shows a "UML" state diagram which describes the procedure for measuring the blower speed (UML=Unified Modeling Language; in this UML diagram, the symbols "/" mean "condition and/or action", and the symbols "&&" mean "and". )

First, the system "learns" a constant ground speed. As mentioned above, a uniform flow of crop material during the measurement procedure is an important requirement for performing an optimization. The throughput quantity depends to a considerable extent on the speed, however. It must therefore be ensured that the average speed be held as constant as possible during the entire optimization process. This state, during which the current ground speed is being "learned", is displayed to the operator, as shown in FIG. 3, in user interface 41 of control terminal 40. In this procedure, the working units use the crop-dependent default values in the electronic fieldwork system as the starting values. These are the basic settings for the units. The starting value of the particular control parameter is displayed in setting-value display fields 45. In this case, the starting values are a blower speed of 1,200 rpm, an upper-sieve setting of 15 mm, and a lower-sieve setting of 9 mm, which could be used as the starting values when harvesting wheat, for example.

As soon as a mean ground speed is reached, this is also displayed on user interface 41 (refer to FIG. 4). On user interface 41, the current speed within a tolerance range is also displayed, in a speed-display field. The driver must then ensure that the current speed within this tolerance range remains in the middle—as depicted in the display—to the greatest extent possible.

The Stop field is now displayed instead of the Start field. The operator can use the Stop field to stop the optimization process at any time. When he does so, the machine returns to the starting values. Likewise, the operator can use the symbols displayed next to setting-value display fields 45 to select which of the control parameters, "blower speed" SG, "upper-sieve width" SO, or "lower-sieve width" SU to optimize. According to the standard procedure, as shown in FIG. 5, the blower is optimized first, followed by the upper sieve and then the lower sieve.

Once the desired ground speed has been reached, the first measurement setting value is applied for the parameter to be optimized, i.e., the blower speed in this case. The system itself is then initially in a waiting state until a start-up phase has been completed, in which the parameters have stabilized once the ground speed and starting values have been set. A fixed delay time of, e.g., a few seconds, can be specified for this. Once the start-up phase has been completed and the current target harvesting conditions have been achieved, measurement of the first measured value can be started.

Figure 8:
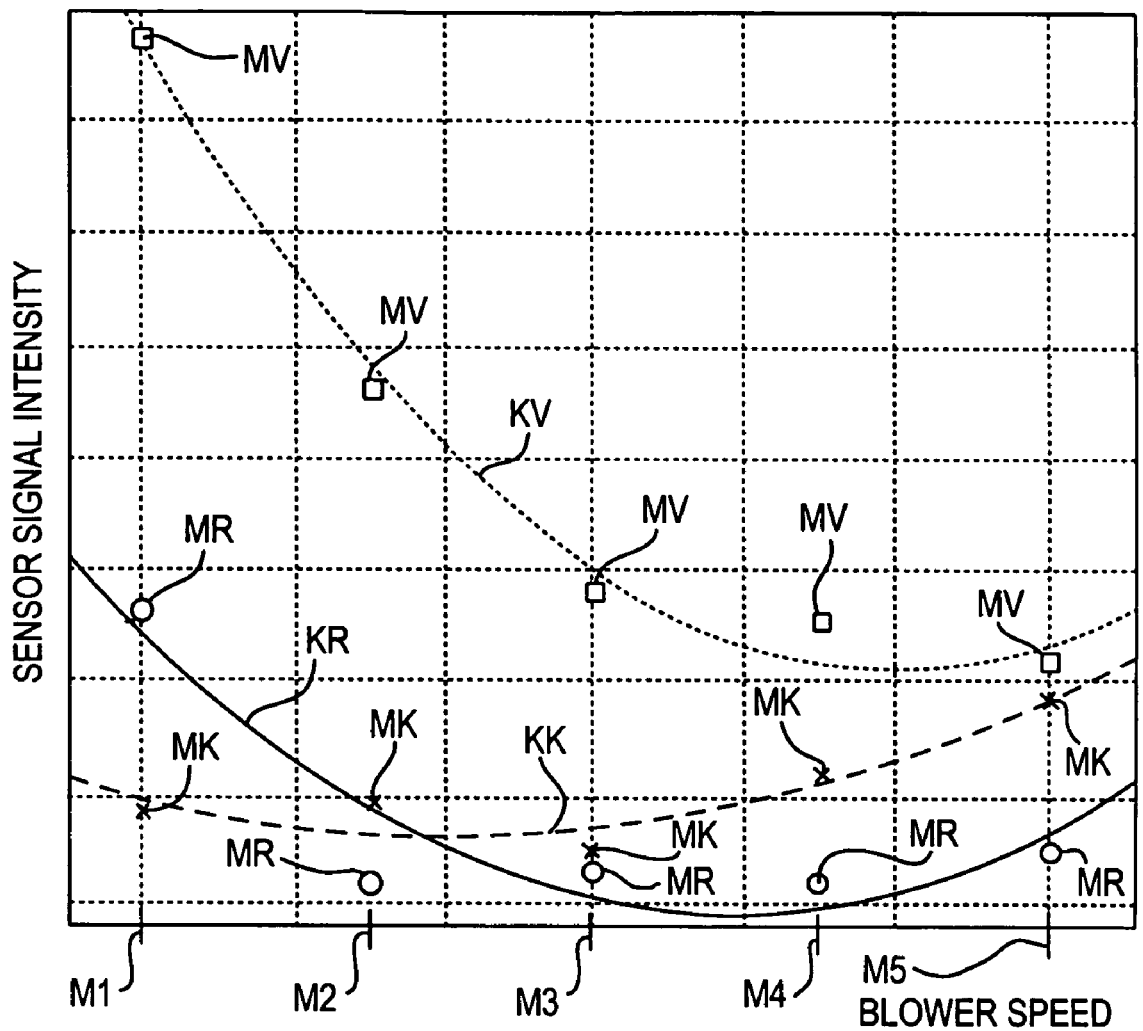
FIG. 8 shows a diagram that depicts the plotting of operating-result curves based on operating-result measured values.

Various measuring units 16, 17, 18 then acquire various operating-result measured values MR, MK, MV at the predetermined, first test point $M_1$. This means, e.g., a measured value MR for the losses due to cleaning, a measured value MK for the grain tailings, and a measured value MV for the total tailings are acquired when a relatively low speed has been set. This is shown in FIG. 8. In FIG. 8, various measured values MV, MR, MK are shown plotted to the far left for first test point $M_1$ with respect to the blower speed. When measured-value acquisition has been completed, the next test point, $M_5$, is applied. After the start-up phase has been completed, the further measured values for losses due to cleaning, grain tailings and total tailings are acquired. These measured values are also plotted in FIG. 8.

In this case, it is preferably not the next higher test point, $M_2$, that is applied, but rather a test point $M_5$ located at the other end of the range to be measured. This means, e.g., the measurement is first carried out at the lowest blower speed to be measured, and then at the highest blower speed to be measured. Measurements are then carried out at the second-lowest blower speed, followed by the second-highest blower speed, etc. The advantage of performing measurements in an alternating manner, at high and low extreme values, is that, since the losses and tailings are typically greater in these ranges, the units will not be overloaded, and systematic measurement errors that could result from accumulatively added disturbances are prevented.

If the target harvesting conditions stop being met during measured-value acquisition, e.g., because the machine has driven out of the field to be harvested, the measurement is interrupted and, e.g., the starting values specified by the field-work information system can be applied, and the measured value which has already been measured can be stored. The machine then remains in the waiting state until the target harvesting conditions are attained again. Measurement setting value $M_1$, $M_2$, $M_3$, $M_4$ $M_5$ at which the current measurement is to be carried out is then set again and, after the start-up phase has been completed, measured-value acquisition is continued.

This interruption of the measurement procedure can take place automatically, e.g., with the aid of sensors used to detect the field to be harvested. Two sensors are preferably used for this purpose. A crop-layer height can be determined in the feeder using a first sensor. When the machine is driven off of the field, the height of the straw in the feed rake decreases, practically without any time delay. This sensor can be used to determine when the machine leaves the field to be harvested, and the measurement can therefore be interrupted immediately. A separate measuring unit, e.g., a grain-throughput measuring unit, is preferably used to restart the measuring procedure. It checks to determine whether the grain throughput has climbed above a minimum threshold again. Since this sensor, which registers the quantity being conveyed in the upper region of the grain elevator, for example, has a delayed reaction relative to the cleaning unit, the layer of crop material on the upper sieve of the cleaning unit has formed completely, even when this sensor reading is low, thereby indicating with certainty that the target harvesting conditions are in place again.

Figure 7:
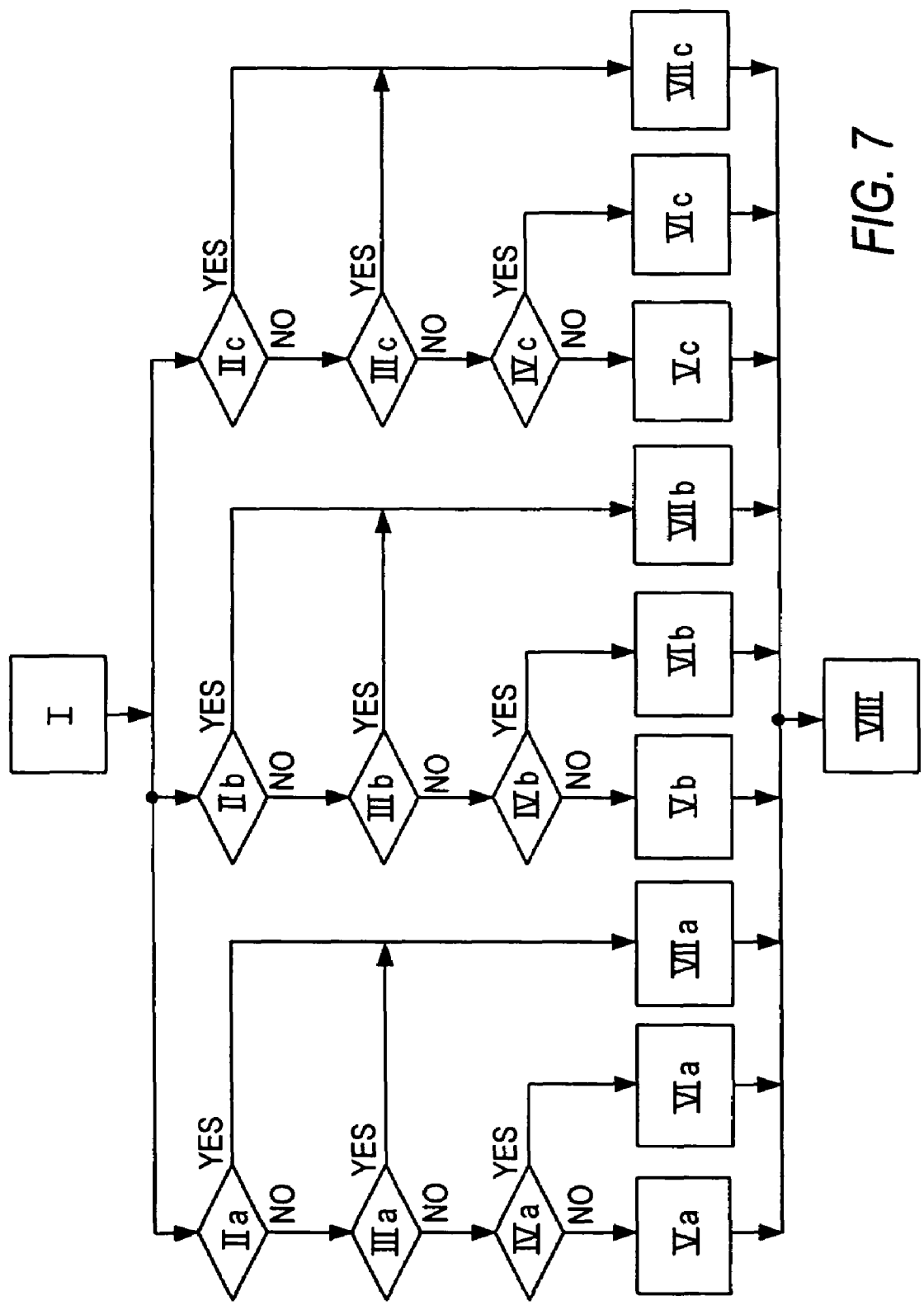
FIG. 7 shows a flow chart for computing an optimized target setting value for a control parameter of a cleaning unit.

Once all measurements have been completed, the optimum target setting value ZG is determined in a subsequent step, in the manner according to the present invention. Reference is made to FIGS. 7 and 8 in the explanation of this procedure.

In a first step I, mathematical functions are adapted for operating-result measured values MR, MK, MV, in order to obtain operating-result curves KR, KK, KV. Since it can be expected, due to the physical conditions, that curves KR, KK, KV are parabolic in shape, the best-fit mathematical functions are determined using quadratic regression based on the recursive least squares method. The basic form of a quadratic function of this type is:

$$y = a_2 x^2 + a_1 x + b \tag{1}$$

The three coefficients $a_1$, $a_2$, b for this equation are determined in a regression analysis based on measured values MR, MK, MV that were obtained. The following equations are used for this purpose, in order to calculate a factor k and auxiliary variables A through F:

$$k = n(\sum x_i^2)(\sum x_i^4) + 2(\sum x_i)(\sum x_i^2)(\sum x_i^3) - \tag{2}$$
$$(\sum x_i^2)^3 - n(\sum x_i^3)^2 - (\sum x_i)^2(\sum x_i^4)$$

$$A = [(\sum x_i^2)(\sum x_i^4) - (\sum x_i^3)^2]\frac{1}{k} \tag{3}$$

$$B = [n(\sum x_i^4) - (\sum x_i^2)^2]\frac{1}{k} \tag{4}$$

$$C = [n(\sum x_i^2) - (\sum x_i)^2]\frac{1}{k} \tag{5}$$

$$D = [(\sum x_i^3)(\sum x_i^2) - (\sum x_i)(\sum x_i^4)]\frac{1}{k} \tag{6}$$

$$E = [(\sum x_i)(\sum x_i^3) - (\sum x_i^2)^2]\frac{1}{k} \tag{7}$$

$$F = [(\sum x_i)(\sum x_i^2) - n(\sum x_i^3)]\frac{1}{k} \tag{8}$$

Using factor k and auxiliary variables A through F, the individual coefficients of the regression polynomial can be determined, as follows:

$$b = A\Sigma y_i + D\Sigma x_i y_i + E\Sigma x_i^2 y_i \tag{9}$$

$$a_1 = D\Sigma y_i + B\Sigma x_i y_i + F\Sigma x_i^2 y_i \tag{10}$$

$$a_2 = E\Sigma y_i + F\Sigma x_i y_i + C\Sigma x_i^2 y_i \tag{11}$$

In the equations shown above, n is the number of test points, $x_i$ represents the values of the individual test points, and $y_i$ represents the operating result-measured values measured at test points $x_i$ for the particular operating-results parameter, and i is an index variable that counts from 1 to n. Addition is performed accumulatively from i=1 through n.

Curve KR for the losses due to cleaning, curve KK for the grain tailings, and curve KV for the total tailings are shown in FIG. 8. All of the curves decrease initially as the blower speed increases, and they subsequently start to rise as the blower speed increases. The reason for this is that, when blower speeds are too low, an excessively thick layer forms on sieves 12, 13, and cleaning unit 10 can no longer operate effectively. If the blower speed is increased too much, the wind causes an excessive quantity of particles to be carried out of the machine, thereby causing the losses to increase significantly. Likewise, an increasing quantity of grains that should drop through lower sieve 13 are carried into the total tailings, thereby causing grain-tailings curve KK and volume-tailings curve KV to increase.

Each of the minimum values RM, KM, VM of curves KR, KK, KV is the ideal setting value for the blower with respect to the particular curve KR, KK, KV. Unfortunately, however, minimum values RM, KM, VM are not aligned directly one above the other, which means an optimum target setting value ZG must be determined that takes all result parameters into account in a suitable manner. To this end, minimum values RM, KM, VM of individual curves KR, KK, KV are linked in a suitable manner. This step is preceded, however, by a few inquiries to determine the extent to which the individual plotted curves KR, KK, KV have informative value.

This process is shown in FIG. 7. Step I is the quadratic regression, which is carried out for all three operating-results parameters, i.e., the losses due to cleaning, the grain tailings, and the total tailings, in order to plot the three curves KR, KK, KV.

In parallel with this step, curve-specific target setting values ZR, ZK, ZV are initially determined for all three operating-result curves KR, KK, KV. The following inquiries are carried out for this purpose (the explanations below relate to the handling of the cleaning-loss curve KR, as an example):

For curve KR, a check is initially carried out in Step IIa to determine whether the shape factor, which is a measure of the curvature of the parabola, is sufficiently great. This means that the shape factor of measured curve KR is compared with a threshold value and, only if this is the case, the minimum value RM of plotted curve KR is accepted as curve-specific target setting value ZR for the blower speed in terms of losses due to cleaning (Step VIIa). If the shape factor is too low, the minimum value RM is not unequivocal, and the informative value of curve KR is very low.

In a further query step, IIIa, a query is therefore made as to whether the signal change is sufficiently great. To this end, a check is carried out to determine whether the difference between the operating-result value in minimum RM of curve KR and an operating-result measured value at a maximum test point of the particular control parameter—at a blower speed test point in this case—exceeds a certain value. If so, it can be assumed that the curve is indeed distinct enough. As a result, in Step VIIa, the minimum value on curve KR is accepted as the optimim curve-specific target setting value ZR for the blower in terms of the losses due to cleaning.

If not, a check is carried out in Step IVa to determine whether a signal change can even be detected. To this end, the difference—described above—between minimum RM of operating-result curve KR and an operating-result measured value is applied once more at a higher test point of the particular control parameter and compared with a further, lower threshold value. If the difference is not below this threshold value, it is assumed that the curve does not have informative value, and the crop-dependent starting value specified by the electronic fieldwork system is applied as the curve-specific target setting value ZR of the control parameter in terms of the losses due to cleaning (Step Va). If the differential value is below the threshold value, however, i.e., if a signal change cannot be detected, this starting value plus an offset value is used, i.e., the blower speed is increased by a certain value, and this value is used as curve-specific target setting value ZR. Since the losses do not increase significantly in this case when the blower speed is increased, it makes sense in terms of losses to select curve-specific target setting value ZR, since the cleaning output is improved as a result without having to put up with higher losses.

In Steps IIb through VIIb, the same method is carried out in parallel for the grain tailings, and in Steps IIc through VIIc for the total tailings. The only difference between the two is that, in Step VIIb and VIIc, identified minimum values KM, VM of particular curves KK, KV are also acted upon with an offset value OK, OV in order to determine the particular curve-specific target setting values ZK, ZV. Offset values OK, OV are used to assign top priority to the losses due to cleaning in the computation of optimum target setting value ZG, i.e., they are used to place greater weight on cleaning-loss curve KR, since grain tailings and total tailings should play a somewhat lesser role in daily operation compared with the losses due to cleaning.

Offset OK, OV is applied such that the blower speed is increased with respect to minimum value KM) of grain tailings curve KM, and the blower speed is reduced with respect to minimum value KV of total tailings curve KV. A fixed offset value with respect to the operating-result parameter is specified in the system. A displacement of this type along the measured curve around a fixed operating-result value, i.e., in the y-direction of particular curve KK, KV, makes it possible to dynamically adapt offset OK, OV with respect to the control parameter, i.e., in the x-direction. This means the actual offset value is a function of the slope of curve KK, KV within the minimum range. If curve KK, KV has sharp curvature, displacement is slight. If curves are relatively flat and the differences in tailings are therefore slight, the displacement is greater.

A displacement of the optimum target setting value of this type with respect to a certain control parameter can be calculated based on the solution of the quadratic equation (1), as follows:

In this case, $Y_{Min}$ is the operating-result value in minimum value KM, VM of particular operating-result curve KK, KV, and $X_{Neu}$ is the curve-specific target setting value ZK, ZV for the control parameter with respect to this curve KK, KV, which is used instead of identified minimum value KM, VM of curve KK, KV. Depending on the sign of the square root in the quadratic formula in equation (12), the shift is to the left (for total tailings) or to the right (for grain tailings).

Default value VW—which the operator entered at the beginning of the optimization process—can also be applied to the offsets to attain "increased cleaning output" or "increased cleanliness". Accordingly, the offsets of grain tailings curve KK and total tailings curve KV are shifted to the left or right. As an alternative, of course, an offset in one direction or the other can also be applied to target setting value ZG computed overall, depending on the default value.

Curve-specific target setting values ZR, ZK, ZM computed in Steps Va through VIIa, Vb through VIIb and Vc through VIIc are then averaged in Step VIII. This mean is optimized target setting value ZG for the particular control parameter, which is blower speed ZG in this case.

Figure 9:
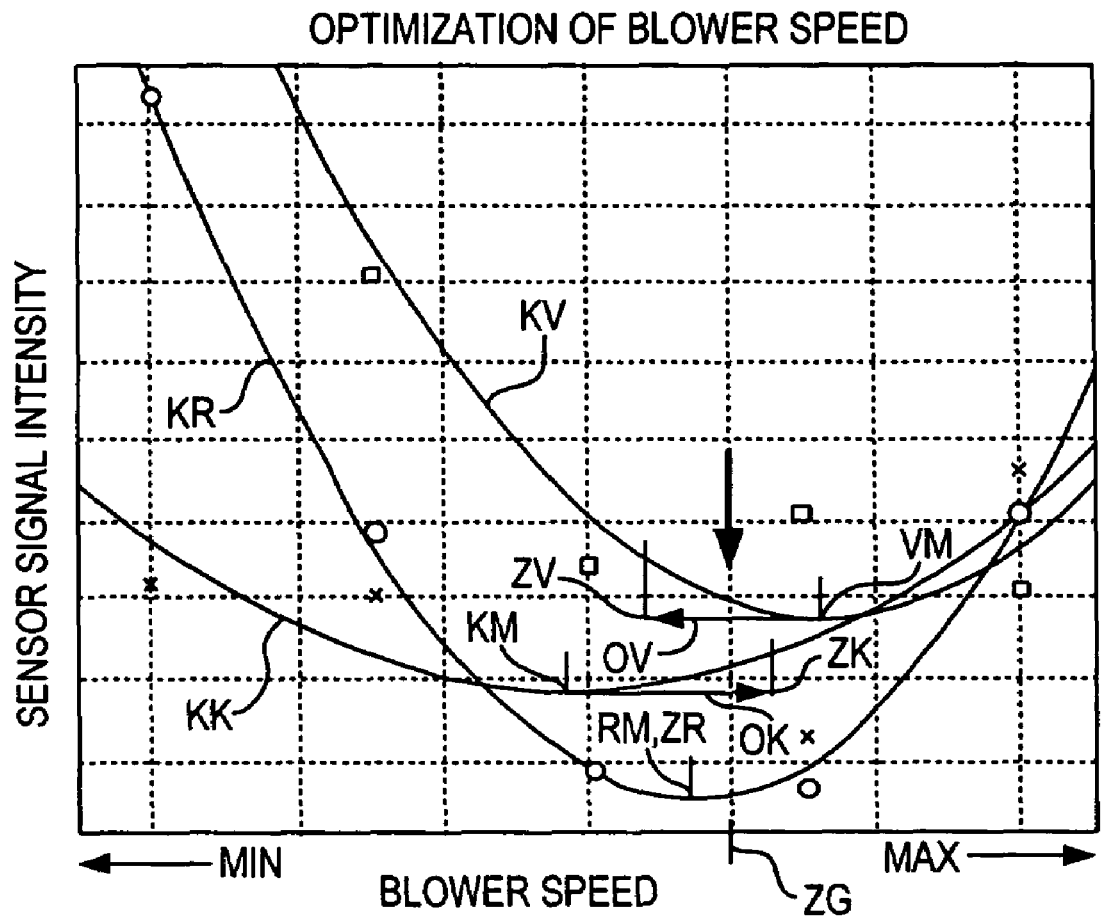
FIG. 9 shows a diagram that depicts the identification of an optimized target setting value for the blower speed of a cleaning unit.

This procedure is depicted graphically in FIG. 9. FIG. 9 shows operating-result curves KR, KK, KV for the losses due to cleaning, the total tailings, and grain tailings. The minimum values RM, KM, VM are labeled on each of three curves KR, KK, KV. In addition, offsets OK, OV and resultant curve-specific target setting value ZK, ZV are plotted for grain tailings curve KK and total tailings curve KV. Optimum target setting value ZG is also labeled; it is computed from the mean of curve-specific target setting values ZR, ZK, ZV, which corresponds to the minimum value on cleaning-loss curve KK. It is also labeled with an arrow in the figure.

After optimized target setting value ZG has been determined for blower speed SG, the blower can be set with target setting value ZG (refer to FIG. 6).

This procedure is followed by optimization of the upper sieve, as shown in FIG. 5, in which case optimized target setting value ZG of blower 11 is used. In this case, the starting values for blower speed SG are therefore previously-determined optimized target setting value ZG and, for all further parameters, the crop-dependent starting values taken from the electronic fieldwork information system.

Subsequently, as was the case for blower optimization, measured values are determined for the losses due to cleaning, total tailings and grain tailings for various settings of upper-sieve width SO. The procedure is exactly the same as the procedure used to compute target setting value ZG for blower speed SG, as was explained with reference to FIGS. 6 and 7, i.e., the same method steps are taken, but this time they are used to set the upper sieve width. Curves KR, KK, KV are also plotted for all three operating-result parameters using quadratic regression (refer to Step I in FIG. 7), and the minimum values are subsequently linked in a suitable manner.

Figure 10:
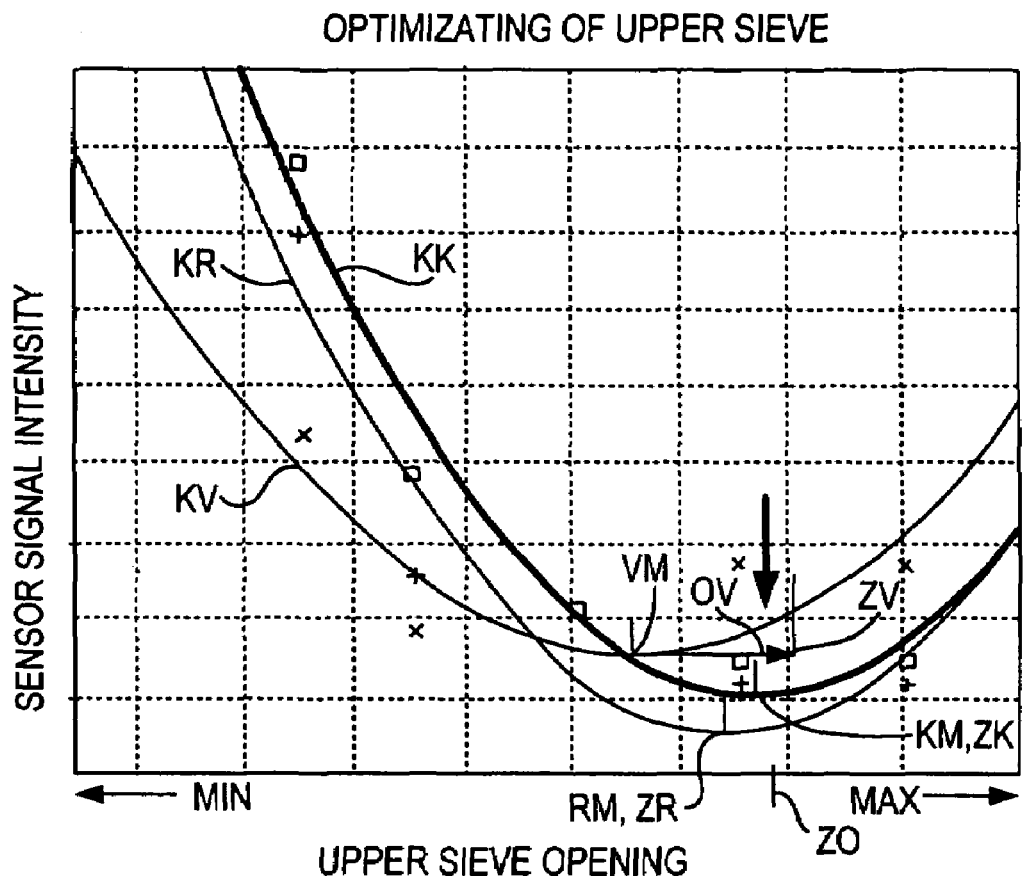
FIG. 10 shows a diagram that depicts the identification of an optimum target setting value for the upper-sieve opening width.

The only difference in terms of determining target setting value ZG for blower speed SG is that an offset OV is set only for total tailings. Minimum value RM, KM of curves KR, KK are used as curve-specific target setting value ZR, ZK for the grain tailings and losses due to cleaning. This is depicted graphically in FIG. 10. In this case as well, minimum values RM, KM, VM of all three curves KR, KK, KV are indicated, and offset OV and curve-specific target setting value ZV are also indicated for total tailings-curve KV. Target setting value ZO for the upper sieve opening which results from the individual values is also shown.

As shown in FIG. 5, after optimization is carried out for the upper sieve, optimization is carried out for the lower sieve. The individual operating-result values are also measured, in this case, as a function of the setting for the lower sieve width in a manner similar to that depicted in FIG. 6.

Figure 11:
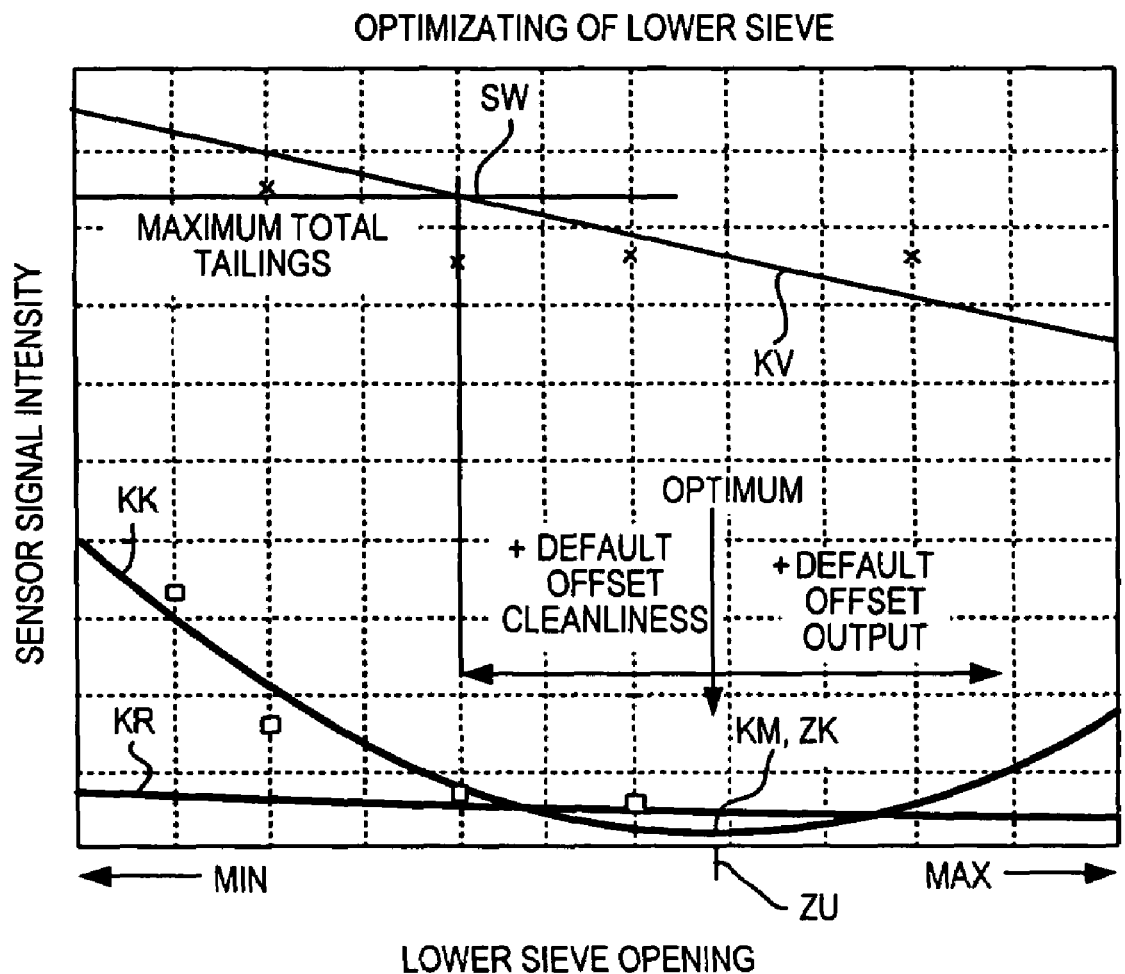
FIG. 11 shows a diagram that depicts the identification of an optimum target setting value for the lower-sieve opening width.

Optimum target setting value ZU for lower-sieve opening SU (refer to FIG. 11) is computed only as a function of grain-tailings curve KK and volume-tailings curve KV, since the lower sieve does not affect the losses due to cleaning. In addition, for the total tailings, a quadratic curve is not adapted to the measured values. Instead, linear regression is used to determine a straight line as characteristic KV, since total tailings decrease the wider the opening of lower sieve 13 becomes, and it cannot subsequently increase.

Target setting value ZU is therefore determined primarily based on minimum value KM of grain-tailings curve KK, an offset being applied in one direction or another to curve-specific target setting value ZK determined there (which corresponds to minimum KM in this case), depending on default value VW. This is done to attain either increased cleanliness or increased cleaning output. If the objective is to increase cleaning output, lower sieve 13 is opened somewhat wider. If the objective is to increase cleanliness, the width of the lower sieve opening is reduced.

In this case, the two operating-result curves KK, KV are therefore not linked by linking minimum values of the two curves KK, KV, but rather by selecting a threshold value SW by referring to a curve KV—volume-tailings curve KV, in this case—that may not be fallen below in the computation of an optimum target setting value ZU using another curve, i.e., grain-tailings curve KK in this case. In this manner it is ensured that, even though a value for lower-sieve opening width SU is obtained that is ideal with respect to grain tailings, the total tailings are not so great that threshing mechanism 4 is overloaded, which would reduce the total output of machine 1.

After optimization of the lower sieve has been carried out, a wait ensues to determine whether an event will occur that would require that optimization be repeated (refer to FIG. 5). An automatic restart of the optimization process can take place in a time-dependent manner, for example, when it can be assumed that the harvesting conditions have changed. The restart can take place in a throughput-dependent manner if, e.g., the harvesting speed has changed significantly. The restart can take place in a setting-dependent manner if other settings on the combine harvester are changed that indicate that the cleaning load has changed accordingly. The restart can take place in a crop-dependent manner if, e.g., a change in a crop property such as grain moisture is measured. If optimization must indeed be repeated, then the crop-dependent setting values are not taken from the electronic fieldwork information system to be used as the default values for the start, but rather target setting values ZG, ZO, ZU that were computed in the first optimization procedure. Target setting values ZG, ZO, ZU can also be entered in the electronic fieldwork information system, of course, in which case the harvesting conditions are also preferably recorded, to the extent this is possible, so that target setting values ZG, ZO, ZU computed in an optimization process can also be used as the starting values in a subsequent harvesting process in which the harvesting conditions are relatively similar to those that prevailed when target setting values ZG, ZO, ZU were computed.

For safety reasons, the system is designed such that the driver can manually override one or all of the machine parameters that were set, at any time during a harvesting operation. Finally, it is pointed out once more that the combine harvester shown in the figures, and the control and the specific method described in conjunction therewith are merely exemplary embodiments that could be modified in a variety of ways by one skilled in the art, without leaving the framework of the present invention.

It will be understood that each of the elements described above, or two or more together, may also find a useful application in other types of methods and constructions differing from the types described above.

While the invention has been illustrated and described as embodied in a method for computing a target setting value, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for controlling a working unit of a harvesting machine, comprising the steps of determining a target setting value (ZG, ZO, ZU) which has been adjusted according to a harvesting process, for a control parameter (SG) of the working unit of the harvesting machine including calculating operating-result curves (KR, KK, KV) by a calculating unit, for a plurality of different operating-result parameters as a function of a related control parameter (SG, SO, SU) while using a number of different setting values of the control parameter (SG, SO, SU), acquiring operating-result measured values (MR, MK, MV), adapting a mathematical function for the operating-result measured values (MR, MK, MV), and based on a combination of the operating-result curves (KR, KK, KV), computing the target setting value (ZG, ZO, ZU) of the control parameter (SG, SO, SU); and, controlling the working unit based on the target setting value that was determined.

2. A method as defined in claim 1, further comprising subjecting the operating-result measured values (MR, MK, MV) to a regression analysis to compute an adapted mathematical function.

3. A method as defined in claim 1, wherein said computing of the target setting value includes taking into account a default value (VW).

4. A method as defined in claim 1, wherein said computing the target setting value (ZG, ZO, ZU) of the control parameter includes a first step selected from the group consisting of computing curve-specific target setting values (ZR, ZK, ZV), computing curve-specific target setting value ranges for the individual operating-result curves (KR, KK, KV), and both; and linking the same according to a predetermined rule.

5. A method as defined in claim 1, wherein said computing the target setting values (ZG, ZO, ZU) of the control parameter includes computing selected from the group consisting of computing extreme values (RM, KM, VM), computing inflection points of the operating-results curves (KR, KK, KV), and both; and linking the same according to a predetermined rule.

6. A method as defined in claim 5, further comprising calculating a mean for the computing the target setting value (ZG, ZO, ZU) of the control parameter based on the curved-specific target setting values (ZR, ZK, ZV), or the extreme values (RM, KM, VM), or inflection points of the operating-results curves (KR, KK, KV).

7. A method as defined in claim 5, further comprising acting in a linking procedure with an offset value (OK, OV) upon the extreme value (RM, KM, VM) or the inflection point of at least one of the operating-results curves (KR, KK, KV).

8. A method as defined in claim 7, further comprising selecting the offset value (OK, OV) as a function of a slope of the operating-result curve (KR, KK, KV) in this range.

9. A method as defined in claim 7, further comprising selecting the offset value as a function of a default value (VW).

10. A method as defined in claim 1, further comprising including a cleaning device in the working unit; and including in the operating-results curves (KR, KK, KV), separating curves for losses due to a factor selected from the group consisting of cleaning, grain tailings, total tailings, and combinations thereof.

11. A method as defined in claim 10, further comprising setting a factor selected from the group consisting of a blower speed (SG), an upper-sieve opening width (SO) of the cleaning device, and both, based on the separating curves (KR, KK, KV) for losses due to the cleaning, the grain tailings, and the total tailings.

12. A method as defined in claim 10, further comprising setting a lower-sieve opening width (SU) of the cleaning device based on the curves (KK, KV) for the grain tailings and the total tailings.

13. A method as defined in claim 1, wherein acquiring the operating-result measured value (MR, MK, MV) includes holding harvesting conditions constant within a certain tolerance range over a predetermined measurement period.

14. A method as defined in claim 1, further comprising automatically interrupting a measurement of the operating-result measured value (MR, MK, MV) when the harvesting machine is driven out of a field to be harvested; and automatically restarting the measurement when the harvesting machine is driven back into the field to be harvested.

15. A method as defined in claim 1, further comprising computing the target setting value (ZG, ZO, ZU) for the control parameter (SG, SO, SU) of the working unit includes computing in succession; after a target setting value (ZG) for an initial control parameter (SG) is computed, controlling the working unit based on the computed target setting value (ZG); and subsequently computing a target value (ZO) for a further control parameter (SO) of the working unit.

16. A method as defined in claim 15, further comprising providing a cleaning device in the working unit; computing a target setting value (ZG) for a blower speed (SG) of the cleaning device in a first step; computing a target setting value (ZO) for an upper-sieve opening width (SO) of the cleaning device in a second step; and computing a target setting value (ZU) for a lower-sieve opening width (SU) of the cleaning device in a third step.

17. A method as defined in claim 1, further comprising computing a new target setting value (ZG, ZO, ZU) for a control parameter (SG, SO, SU) of the working unit in a case selected from a group consisting of: 1) after a certain time period, 2) if a predetermined event occurs, and 3) both after a certain time period and if a predetermined event occurs; and controlling the working unit based on the new target setting value.

18. A method as defined in claim 17, further comprising including in the event a case selected from the group consisting of: 1) a crop-material throughput, 2) a change in settings for other control parameters, 3) a change to a crop-material parameter, and 4) any combination of 1), 2) and 3).

19. A computer program product loadable directly in a memory of a programmable control unit of a harvesting machine, the computer program product having program code means for carrying out all steps of the method defined in claim 1.

\* \* \* \* \*